(12) United States Patent
Kamioka (10) Patent No.: US 7,813,234 B2
(45) Date of Patent: Oct. 12, 2010

(54) OPTICAL PICKUP AND OPTICAL PICKUP ABERRATION CORRECTING METHOD

(75) Inventor: Yuichi Kamioka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 301 days.

(21) Appl. No.: 12/216,307

(22) Filed: Jul. 2, 2008

(65) Prior Publication Data
US 2009/0010113 A1    Jan. 8, 2009

(30) Foreign Application Priority Data
Jul. 3, 2007    (JP) .............................. 2007-174781

(51) Int. Cl.
*G11B 7/00*    (2006.01)
(52) U.S. Cl. .............................. 369/44.32; 369/112.02; 369/112.24; 369/112.29
(58) Field of Classification Search ........................ None
See application file for complete search history.

(56) References Cited

U.S. PATENT DOCUMENTS 7,130,134 B2* 10/2006 Hendriks .................... 359/717

2004/0017763 A1* 1/2004 Tawa et al. ................... 369/120
2007/0268806 A1* 11/2007 Yamasaki et al. ....... 369/112.02
2009/0213706 A1* 8/2009 Hotta et al. ............... 369/44.32

FOREIGN PATENT DOCUMENTS

| JP | 2005-196859 | 7/2005 |
|---|---|---|
| JP | 2007-052864 | 3/2007 |

* cited by examiner

*Primary Examiner*—Joseph Haley
(74) *Attorney, Agent, or Firm*—Morgan Lewis & Bockius LLP (57) ABSTRACT

An optical pickup includes: a spherical aberration correcting portion for correcting spherical aberration by adjusting a convergence/divergence state of laser light emitted from a light source; a reflecting portion having: a first surface that chooses whether or not to pass laser light emitted from the spherical aberration correcting portion according to the wavelength of the laser light; and a second surface that reflects laser light that has passed through the first surface; and two objective lenses that are selectively used according to whether laser light reflected from the reflecting portion has been reflected by the first surface or by the second surface so as to condense light reflected from the reflecting portion onto a recording layer of an optical disc. Here, between the spherical aberration correcting portion and the objective lenses, there is disposed an astigmatism correcting portion that is formed such that the amount of correction can be changed.

13 Claims, 4 Drawing Sheets

OPTICAL PICKUP AND OPTICAL PICKUP ABERRATION CORRECTING METHOD

This application is based on Japanese Patent Application No. 2007-174781 filed on Jul. 3, 2007, the contents of which are hereby incorporated by reference.

BACKGROUND OF THE INVENTION

1. Field of the Invention

The present invention relates to an optical pickup capable of performing data recording and writing by irradiating an optical disc with a light beam, and more specifically, to a technology for correcting wave aberration (e.g., spherical aberration and astigmatism) so as to improve the quality of data reading and writing.

2. Description of Related Art

Optical discs such as compact discs (hereinafter, CDs) and digital versatile discs (hereinafter, DVDs) have been widely used. Moreover, in recent years, research has been carried out on increasing the recording density of optical discs aiming at increasing the amount of data that can be recorded on optical discs, and optical discs such as HD-DVDs and blue-ray discs (hereinafter, BDs) on which can be recorded a large amount of data have started to be put to practical use.

In performing recording and reproduction with respect to such optical discs, an optical pickup capable of performing data reading and writing by irradiating an optical disc with a light beam is used. Here, the wavelength of the light beam and the numerical aperture (NA) of an objective lens (which has a function of condensing a light beam emitted from a light source onto a recording layer of an optical disc) need to be changed according to the kind of the optical disc.

For example, the wavelengths used for CDs, DVDs, and BDs are 780 nm, 650 nm, and 405 nm, respectively. The NAs of the objective lenses used for CDs, DVDs, and BDs are 0.45, 0.65, and 0.85, respectively.

As described above, in an optical pickup, light beams having different wavelengths and objective lenses having different NAs need to be used for different kinds of optical discs, and one possible way of achieving this is to use different optical pickups for different kinds of optical discs. However, it is more convenient if a single optical pickup is capable of performing, for example, data reading with respect to a plurality of kinds of optical discs, and thus there have conventionally been developed many optical pickups that are compatible with a plurality of kinds of optical discs.

Some optical pickups compatible with a plurality of kinds of optical discs have only one objective lens for condensing a light beam emitted from a light source onto a recording layer of an optical disc, and others have a plurality of objective lenses. Some of the optical pickups that are compatible with a plurality of kinds of optical discs and that have a plurality of (for example, two) objective lenses are structured such that there are formed independent optical paths through which light beams emitted from light sources travel to reach the objective lenses. With this structure, the size of an optical pickup and the number of optical members needed in an optical pickup increase, and this leads to a higher cost.

In this regard, Patent Document 1 proposes an optical pickup that has two objective lenses and a raising prism disposed in an optical system, the raising prism having a first surface that reflects laser light having a wavelength of 660 nm or 780 nm while it transmits laser light having a wavelength of 405 nm, and a second surface that reflects laser light having a wavelength of 405 nm. With this structure, the optical system of an optical pickup can be formed such that optical paths each formed corresponding to one of the objective lenses have a portion thereof in common, instead of being completely independent of each other. Thus, this structure is advantageous in coping with the above mentioned problems, that is, increase in size and cost of an optical pickup.

Optical pickups compatible with a plurality of kinds of optical discs and optical pickups that can handle a multilayer optical disc having a plurality of recording layers disadvantageously suffer from spherical aberration (which is a kind of wave aberration) that occurs due to the difference in thickness between protective layers (including a transparent layer laid between the recording layers, the same shall apply hereinafter) for protecting the recording layers. Thus, various spherical aberration correcting mechanisms for correcting the just described spherical aberration have conventionally been proposed.

Examples of such spherical aberration correcting mechanisms include one that corrects spherical aberration with, for example, a liquid crystal device by changing the phase distribution of a light beam passing through the liquid crystal device, and one that corrects spherical aberration by adjusting the divergence/convergence angle of a light beam that enters an objective lens (see, for example, Patent Document 2).

Patent Document 1: JP-A-2005-196859
Patent Document 2: JP-A-2007-52864

SUMMARY OF THE INVENTION

A first object of the present invention is to provide an optical pickup that has two objective lenses, that is compatible with a plurality of kinds of optical discs, and that is capable of adequately correcting aberration. A second object of the present invention is to provide an aberration correcting method for adequately correcting aberration occurring in an optical pickup that has two objective lenses and is compatible with a plurality of kinds of optical discs.

To achieve the first object, according to one aspect of the present invention, an optical pickup includes: a plurality of light sources emitting light beams having different wavelengths; a spherical aberration correcting portion for correcting spherical aberration by adjusting convergence/divergence states of the light beams emitted from the light sources; a reflecting portion having: a first surface that selects whether to transmit or reflect the light beams emitted from the light sources according to the wavelengths of the light beams; and a second surface that reflects whichever light beam has passed through the first surface; and two objective lenses that are selectively used according to whether the light beams emitted from the light sources are reflected from the first surface or from the second surface so as to condense light reflected from the reflecting portion onto a recording layer of an optical disc. Here, the first surface and the second surface are formed substantially parallel with each other, the reflecting portion is disposed between the spherical aberration correcting portion and the objective lenses, and an astigmatism correcting portion that is formed such that an amount of correction can be changed is further disposed between the spherical aberration correcting portion and the objective lenses.

With this structure, since not only the spherical aberration correcting portion but also the astigmatism correcting portion formed such that the amount of correction can be changed are provided, it is possible to adequately correct spherical aberration and astigmatism that occur in reading data recorded on an optical disc and in writing data on an optical disc.

According to the present invention, in the optical pickup structured as described above, the astigmatism correcting portion may correct astigmatism occurring when a light beam emitted from the spherical aberration correcting portion is reflected by the second surface of the reflecting portion. Since the spherical aberration correcting portion changes the convergence/divergence state of a light beam so as to correct spherical aberration, astigmatism may occur when a light beam emitted from the spherical aberration correcting portion is reflected by the second surface of the reflecting portion; however, with this structure, such astigmatism can be adequately corrected.

According to the present invention, in the optical pickup structured as described above, the astigmatism correcting portion may be formed such that the amount of correction can be changed according to a setting state of the spherical aberration correcting portion. With this structure, in determining the setting conditions of the spherical aberration correcting portion and the astigmatism correcting portion, the setting of the astigmatism correcting portion is determined based on that of the spherical aberration correcting portion, and thus the setting condition for correcting astigmatism can be determined in a short time.

According to the present invention, in the optical pickup structured as described above, the astigmatism correcting portion may be formed of a liquid crystal device having a liquid crystal and two transparent electrodes between which the liquid crystal is laid. With this structure, it is easy to realize an astigmatism correcting portion capable of changing the amount of correction.

According to the present invention, in the optical pickup structured as described above, it is preferable that the reflecting portion be a raising mirror that reflects the light beams emitted from the light sources toward the optical disc. With this structure, the optical system of the optical pickup can be laid out with less wasteful space left, and this helps prevent increase in cost and size of the optical pickup.

According to the present invention, in the optical pickup structured as described above, the spherical aberration correcting portion may be a movable lens that is movable in an optical axis direction, and furthermore, the movable lens may be a movable collimator lens. Particularly preferable is the case where the collimator lens is moved in the optical axis direction so as to correct spherical aberration, which helps achieve a simple optical system.

To achieve the second object, according to another aspect of the present invention, a method for correcting aberration in an optical pickup is a method for use in an optical pickup, including: a spherical aberration correcting portion for correcting spherical aberration by adjusting a convergence/divergence state of a light beam emitted from a light source; a reflecting portion having: a first surface that selects whether to transmit or reflect the light beam emitted from the light source according to the wavelength of the light beam; and a second surface that reflects a light beam that has passed through the first surface; and two objective lenses that are selectively used according to whether the light beam emitted from the light source is reflected from the first surface or from the second surface so as to condense light reflected from the reflecting portion onto a recording layer of an optical disc, there being disposed, between the spherical aberration correcting portion and the objective lenses in the optical pickup, an astigmatism correcting portion that is formed such that an amount of correction can be changed, the method comprising: changing a setting of the astigmatism correcting portion as a setting of the spherical aberration correcting portion is changed.

With this structure, it is possible to adequately correct spherical aberration resulting from the difference in thickness of protective layers and astigmatism resulting from a non-parallel light beam incident on the second surface of the reflecting portion.

DETAILED DESCRIPTION OF THE PREFERRED EMBODIMENTS

Figure 5:
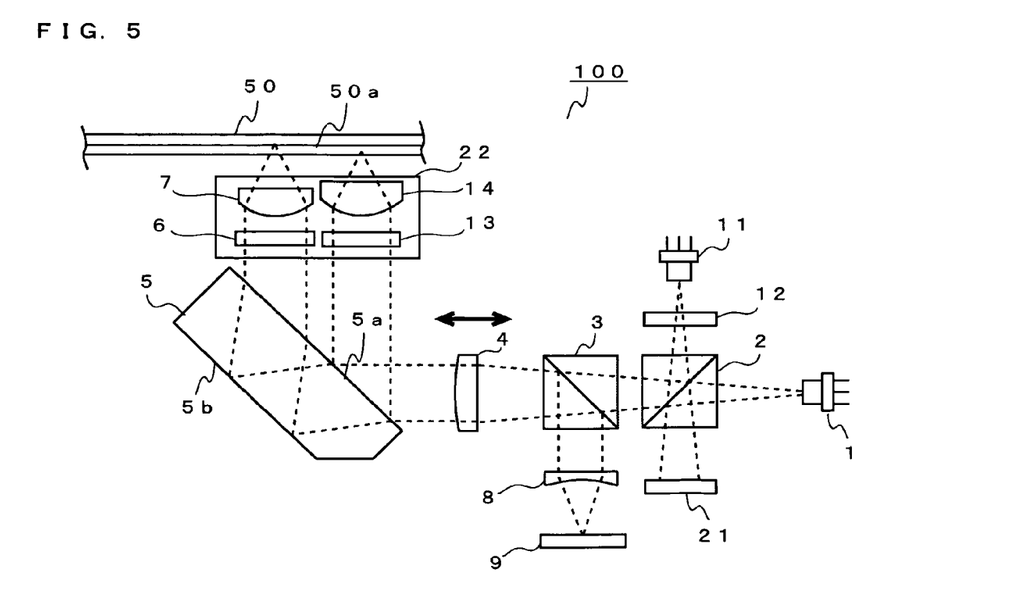
FIG. 5 is a diagram schematically showing the structure of an optical system of an optical pickup the inventor of the present invention had considered before he reached the present invention.

For easier understanding, before giving a description of an embodiment of the optical pickup of the present invention, a description will now be given of an optical pickup the inventor of the present invention had considered before he reached the present invention. FIG. 5 is a diagram schematically showing the structure of an optical system of the optical pickup the inventor of the present invention had considered before he reached the present invention. The optical pickup 100 that the inventor of the present invention had considered before he reached the present invention is an optical pickup compatible with BDs, DVDs, and CDs. A description will be given of the optical pickup 100 with reference to FIG. 5.

The reference numeral 1 denotes a semiconductor laser device for DVDs and CDs (hereinafter, DVD/CD semiconductor laser device), and the semiconductor laser device is a two-wavelength semiconductor laser device that has two light emitting points and can switch between laser light having a wavelength of 650 nm and laser light having a wavelength of 780 nm to emit one at a time. The laser light having a wavelength of 650 nm is used for reading data recorded on a DVD or writing data on a DVD. The laser light having a wavelength of 780 nm is used for reading data recorded on a CD or writing data on a CD.

Hereinafter, a description will be given of the case where laser light is emitted from this DVD/CD semiconductor laser device 1.

Most of laser light (having a wavelength of 650 nm or 780 nm) emitted from the DVD/CD semiconductor laser device 1 is transmitted through a dichroic prism 2, while some portion of the laser light is reflected. The laser light that has been reflected from the dichroic prism 2 is received by a front-monitor photodetector 21. The front-monitor photodetector 21 detects the laser power of the laser light emitted from the DVD/CD semiconductor laser device 1. The DVD/CD semiconductor laser device 1 is APC (auto power control) driven such that the amount of laser power received by the front-monitor photodetector 21 is equal to a predetermined value.

The laser light that has passed through the dichroic prism 2 then passes through a polarization beam splitter 3. This polarization beam splitter 3 cooperates with a first wave plate 6, which will be described later, to serve as an optical isolator. That is, the laser light emitted from the DVD/CD semiconductor laser device 1 is transmitted through the polarization beam splitter 3, but return light coming from an optical disc 50 is reflected by the polarization beam splitter 3. The laser beam emitted from the DVD/CD semiconductor laser device 1 is of linearly-polarized light.

The laser light that has been transmitted through the polarization beam splitter 3 enters a collimator lens 4. The collimator lens 4 is adapted to convert the incident laser light into parallel light. In the optical pickup 100, the collimator lens 4 is allowed to move in an optical axis direction (indicated by the arrow in FIG. 5) by an unillustrated moving device. This makes it possible to adjust the convergence/divergence state (the convergent angle/divergent angle) of laser light that passes through the collimator lens 4. The collimator lens moves in the optical axis direction as described above, and thereby spherical aberration can be corrected. Therefore, it is correct to say that the movable collimator lens 4 serves as a spherical aberration correcting portion.

The laser light that has passed through the collimator lens 4 is reflected by a raising mirror 5. The raising mirror 5 is formed as a flat plate, having a first surface 5a and a second surface 5b that are substantially parallel with each other. Laser light having a wavelength of 650 nm or 780 nm is transmitted through the first surface 5a, while laser light having a wavelength of 650 nm or 780 nm is reflected by the second surface 5b. Thus, laser light emitted from the DVD/CD semiconductor laser device 1 is reflected by the second surface 5b. Here, the optical axis of the laser light reflected by the second surface 5b of the raising mirror 5 is oriented in a direction substantially perpendicular to the surface of the optical disc 50.

The light reflected by the raising mirror 5 enters the first wave plate 6. The first wave plate 6 is a quarter wave plate, and circularly polarizes the laser light that enters it.

A first objective lens 7 condenses laser light that enters it onto a recording layer of the optical disc 50 (a DVD or a CD). This first objective lens 7 is for DVDs and CDs.

The laser light condensed onto the optical disc 50 is reflected on a recording layer 50a (here, the recording layer 50a is single-layered, but it may be multi-layered). Return light reflected on the optical disc 50 is transmitted through the first objective lens 7, and then the first wave plate 6. The return light, by passing through the first wave plate 6, is converted from circularly-polarized light into linearly-polarized light whose polarization direction is rotated by 90 degrees with respect to the laser light emitted from the DVD/CD semiconductor laser device 1.

The return light that has been transmitted through the first wave plate 6 is then reflected by the second surface 5b of the raising mirror 5, then transmitted through the collimator lens 4, and then reflected at the polarization beam splitter 3. The return light is then given astigmatism by a cylindrical lens 8 and is received by a photodetector 9. The photodetector 9 converts optical data which it has received into an electric signal, and outputs the electric signal. The electric signal outputted from the photodetector 9 is then converted into a reproduction signal (RF signal), a focus-error signal, a tracking-error signal, and the like.

In addition to the DVD/CD semiconductor laser device 1, the optical pickup 100 is provided with a BD semiconductor laser device 11. The BD semiconductor laser device 11 emits laser light having a wavelength of 405 nm. The laser light emitted from the BD semiconductor laser device 11 is used for performing data reading and writing with respect to a BD.

Hereinafter, a description will be given of the case where laser light is emitted from this BD semiconductor laser device 11. In the description will be omitted as necessary an overlapping description of what the case has in common with the case where laser light is emitted from the DVD/CD semiconductor laser device 1.

Laser light emitted from the BD semiconductor laser device 11 enters a diffraction grid 12. The diffraction grid 12 divides the incident laser light into three beams, that is, a main beam and two sub beams. Here, the laser beam emitted from the BD semiconductor laser device 11 is divided into three beams, because they are necessary to generate a tracking-error signal.

Most portion of the laser light that has passed through the diffraction grid 12 is reflected by the dichroic prism 2, while some portion of the laser light is transmitted through the dichroic prism 2. The laser light that has passed through the dichroic prism 2 is received by the front-monitor photodetector 21. The BD semiconductor laser device 11 is APC (auto power control) driven such that the laser power obtained at the front-monitor photodetector 21 is equal to a predetermined value.

The laser light reflected at the dichroic prism 2 is transmitted through the polarization beam splitter 3 and then the collimator lens 4. The polarization beam splitter 3 and the collimator lens 4 are the same as in the above description, and thus overlapping descriptions will be omitted here.

The laser light that has passed through the collimator lens 4 is reflected by the first surface 5a of the raising mirror 5 such that its optical axis is oriented in a direction substantially perpendicular to the surface of the optical disc 50. That is, laser light having a wavelength of 650 nm or 780 nm is transmitted through the first surface 5a, while laser light having a wavelength of 405 nm is reflected by the first surface 5a. The first surface 5a as described above can be obtained by forming a dielectric multilayer on a plate-shaped transparent substrate (glass, resin, etc.).

The light reflected by the raising mirror 5 enters a second wave plate 13. The second wave plate 13 is a quarter wave plate, and converts the incident laser light into circularly-polarized light.

A second objective lens 14 condenses laser light incident thereon onto a recording layer of the optical disc 50 (a BD). This second objective lens 14 is for BDs.

The laser light condensed onto the optical disc 50 is reflected by the recording layer 50a (here, the recording layer 50a is single-layered, but it may be multi-layered). Return light that has been reflected from the optical disc 50 passes through the second objective lens 14 and then the second wave plate 13. Then, the return light is reflected by the first surface 5a of the raising mirror 5, passes through the collimator lens 4, and is reflected by the polarization beam splitter 3. Then the return light is given astigmatism by the cylindrical lens 8, and is received by the photodetector 9.

The first objective lens 7 and the first wave plate 6 and the second objective lens 14 and the second wave plate 13 are allowed by an objective lens actuator 22 to move at least in a focus direction (a direction parallel with the optical axis) and in a tracking direction (a direction parallel with the radial direction of the optical disc 50). This makes focus adjustment and tracking adjustment possible. The objective lens actuator 22 is structured to move a lens holder (which is a holder for holding an objective lens) by use of electromagnetic power generated between a magnet and a current flowing through a coil. This structure is well known in the art, and thus a detailed description thereof will be omitted here.

With the optical pickup 100 as described above, in spite of having two objective lenses, increase in size and cost can be prevented, because some optical members are shared for both guiding laser light emitted from the DVD/CD semiconductor laser device 1 and guiding laser light emitted from the BD semiconductor laser device 11 to the optical disc 50. Furthermore, in comparison with the case of Patent Document 1 described above, since a plate-shaped raising mirror 5 is used instead of a raising prism, cost for optical members can also be reduced. Furthermore, since the collimator lens 4 is formed to be movable in the optical axis direction, it is possible to correct spherical aberration by adjusting the position of the collimator lens 4, and thus can be reduced degradation caused by spherical aberration in the quality of data reading and writing.

However, with respect to the optical pickup 100, as will be described below, some cases have been observed where the quality of data reading, for example, is degraded.

Figure 6A:
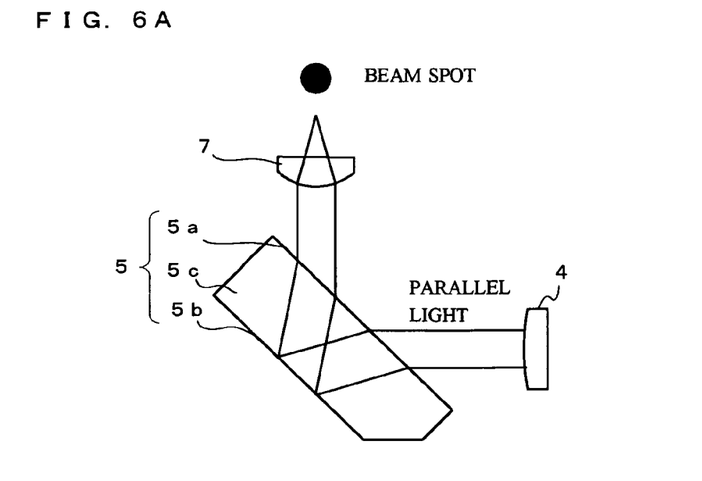
FIG. 6A is a diagram for illustrating a disadvantage of the optical pickup that the inventor of the present invention had considered before he reached the present invention, in the case where laser light emitted from a collimator lens is parallel light.
Figure 6B:
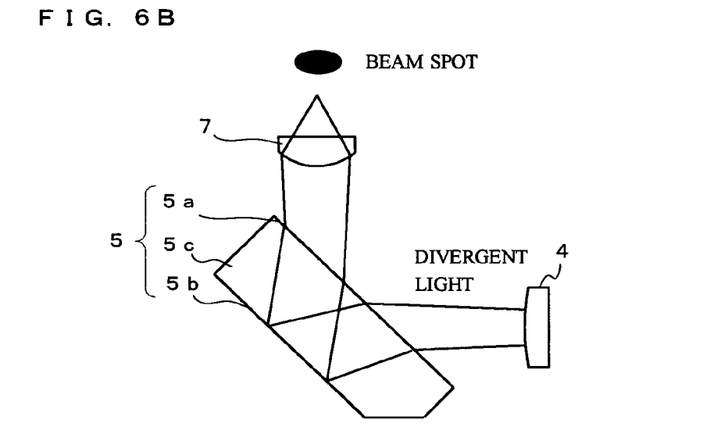
FIG. 6B is a diagram for illustrating a disadvantage of the optical pickup that the inventor of the present invention had considered before he reached the present invention, in the case where laser light emitted from the collimator lens is divergent light.
Figure 6C:
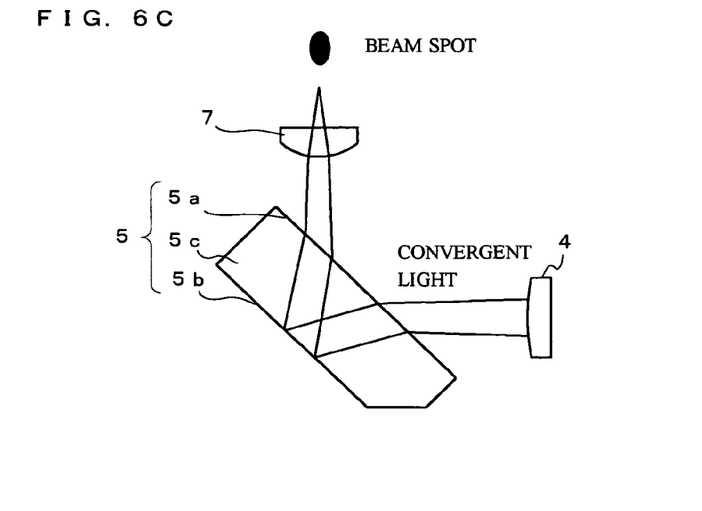
FIG. 6C is a diagram for illustrating a disadvantage of the optical pickup that the inventor of the present invention had considered before he reached the present invention, in the case where laser light emitted from the collimator lens is convergent light.

This will now be described with reference to FIGS. 6A, 6B, and 6C. FIGS. 6A, 6B, and 6C are diagrams for illustrating a disadvantage of the optical pickup that the inventor had considered before he reached the present invention. As described above, the raising mirror 5 provided in the optical pickup 100 has the first surface 5a and the second surface 5b. Between the first surface 5a and the second surface 5b, there exists a transparent member 5c. This transparent member 5c is formed of glass, resin, or the like.

Thus, in the case where laser light is reflected by the second surface 5b, the laser light needs to travel through the transparent member 5c to and from the second surface 5b. In this case, as shown in FIG. 6A, when the laser light is emitted from the collimator lens 4 as parallel light, no astigmatism occurs. In contrast, when the laser light emitted from the collimator lens 4 is not parallel light, that is, when the laser light emitted from the collimator lens 4 is divergent light as shown in FIG. 6B or convergent light as shown in FIG. 6C, astigmatism (a kind of wave aberration) occurs in the laser light emitted from the objective lens 7 (that is, the shape of the beam spot is not circular). This astigmatism, depending on its amount, affects, for example, the quality of data reading. FIGS. 6A, 6B, and 6C each schematically show a beam spot formed on a recording layer of an optical disc as seen from the front side.

One possible way of coping with this is to correct astigmatism by forming the first surface 5a and the second surface 5b of the raising mirror 5 such that they are not parallel with each other (that is, using a raising prism as in Patent Document 1). However, in the case where an optical pickup needs to handle a multilayer optical disc and the optical disc 50 is a multilayer optical disc, it is necessary for the collimator lens 4 to be moved so as to correct spherical aberration in data reading with respect to the same optical disc 50. Thus, the amount of astigmatism is not necessarily constant even in the case where, for example, data reading is performed with respect to the same optical disc 50. Therefore, it is not enough to simply form the raising mirror 5 such that the first surface 5a and the second surface 5b are not parallel to each other.

In view of the above described problems, the optical pickup of the present invention has been developed. Hereinafter, a detailed description will be given of embodiments of the optical pickup of the present invention with reference to the accompanied drawings.

Figure 1:
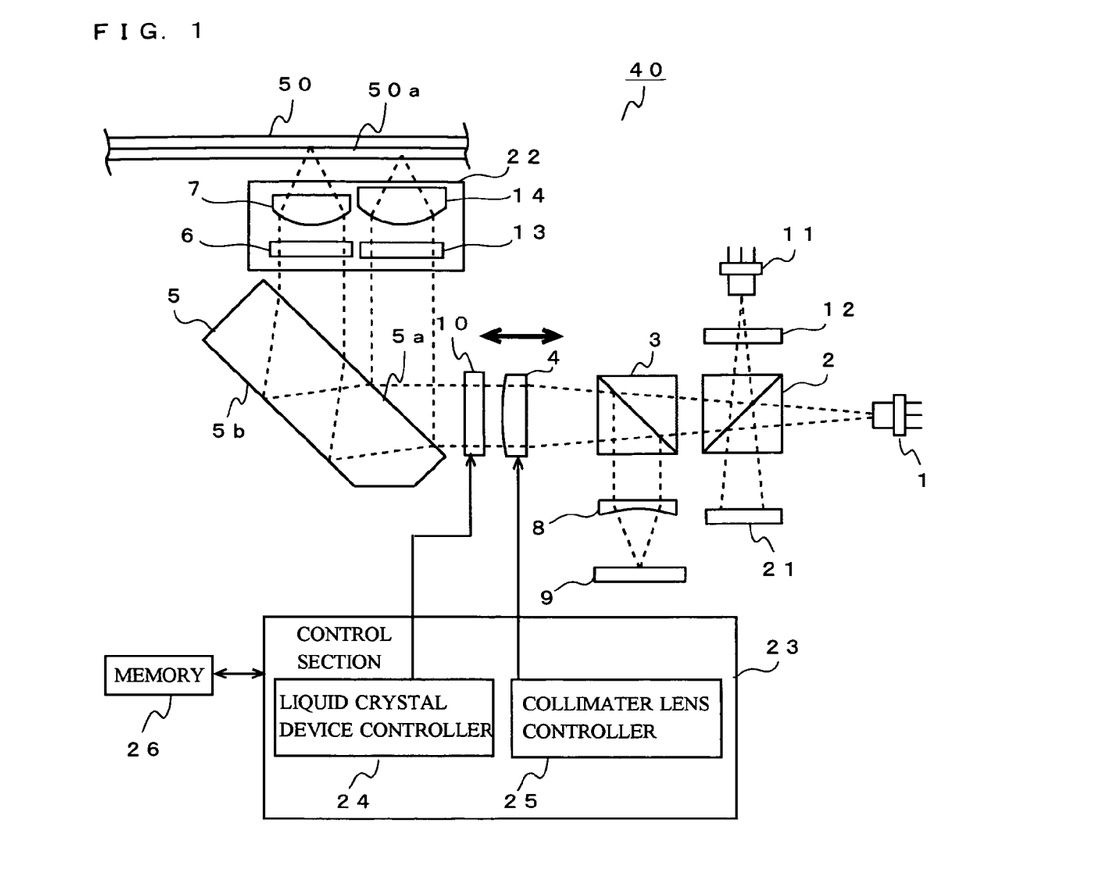
FIG. 1 is a diagram schematically showing the structure of an optical pickup embodying the present invention.

FIG. 1 is a diagram schematically showing the structure of an optical pickup of an embodiment of the present invention. The optical system of the optical pickup 40 of this embodiment has substantially the same structure as that of the above described optical pickup 100 shown in FIG. 5, and thus such components and portions as find their counterparts in the optical pickup 100 are identified with the same reference numerals, and descriptions of such components and portions will be omitted hereinafter, unless particularly necessary.

In the optical pickup 40 of this embodiment, in its optical system, an astigmatism correcting portion 10 is disposed between a collimator lens 4 and a raising mirror 5. In this point, the optical pickup 40 is different from the above described optical pickup 100, and accordingly the control system of the optical pickup 40 is different from that of the optical pickup 100 in some ways, which will be described in detail below.

Figure 2:
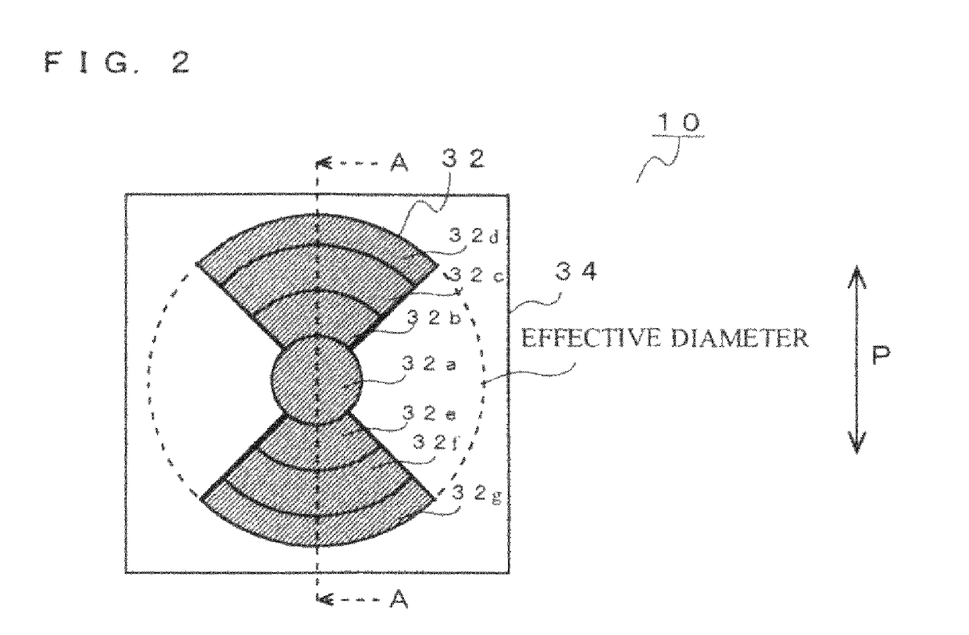
FIG. 2 is a plan view schematically showing the structure of a liquid crystal device provided in the optical pickup embodying the present invention.
Figure 3:
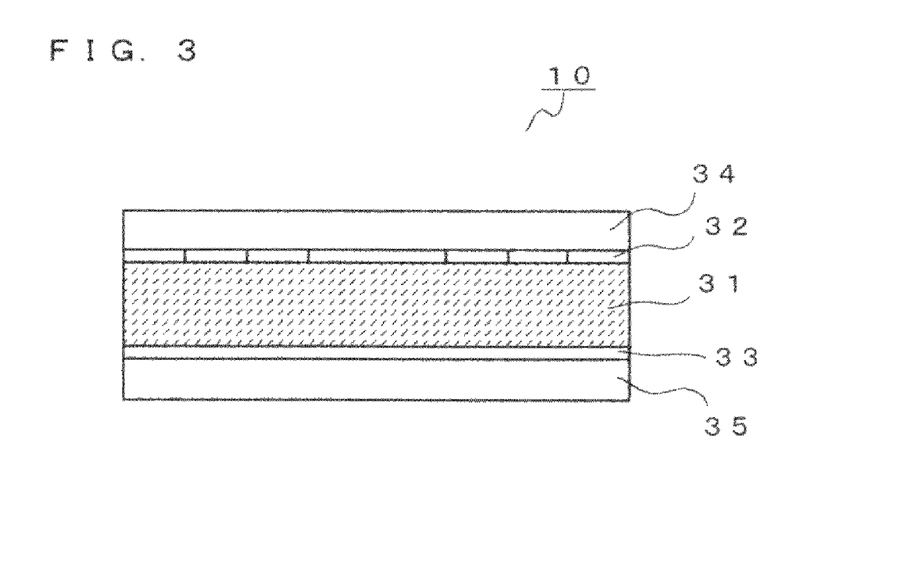
FIG. 3 is a sectional view taken along line A-A of FIG. 2.

The astigmatism correcting portion 10 is a liquid crystal device structured as shown in FIGS. 2 and 3. FIG. 2 is a plan view schematically showing the structure of a liquid crystal device provided in the optical pickup 40 of this embodiment. FIG. 3 is a sectional view taken along line A-A of FIG. 2. Hereinafter, a description will be given of the astigmatism correcting portion 10 with reference to FIGS. 2 and 3.

The liquid crystal device that forms the astigmatism correcting portion 10 is provided with a liquid crystal 31, two transparent electrodes 32 and 33 between which the liquid crystal 31 is laid, and two transparent substrates (e.g., glass substrates) 34 and 35 for supporting the transparent electrodes 32 and 33, respectively. In the description below, the liquid crystal device will be identified with the reference numeral 10.

When no voltage is applied to the transparent electrodes 32 and 33, the molecules of the liquid crystal 31 are oriented in such a manner that they don't particularly affect the laser light passing through the liquid crystal device 10. On the other hand, when a voltage is applied to the transparent electrodes 32 and 33, the orientation direction of the molecules of the liquid crystal 31 is changed according to the level of the applied voltage and the refractive index of the liquid crystal 31 is changed. That is, when laser light enters the liquid crystal device 10 with a voltage applied to the transparent electrodes 32 and 33, a phase difference occurs in the laser light according to the change in the refractive index of the liquid crystal 31.

The transparent electrodes 32 and 33 are each formed of, for example, ITO (indium tin oxide). As shown in FIG. 2, the transparent electrode 32 is divided into a plurality of divided electrodes, and thus is formed of seven divided electrodes 32a to 32g. The direction P shown in FIG. 2 is parallel to a direction that is perpendicular to the surface of the optical disc 50 (which corresponds to the up/down direction in FIG. 1). The transparent electrode 32 is divided into a plurality of divided electrodes for the purpose of giving a phase distribution to laser light that enters the liquid crystal device 10.

The transparent electrode 32 has, in outline, a circular region (the divided electrode 32a) formed in the center thereof and two substantially fan-shaped regions formed such that they sandwich the circular region therebetween along the direction P and such that they are symmetrical to each other with respect to the circular region. The two fan-shaped regions are each divided into three regions, and thereby the divided electrodes 32b to 32g are formed. The transparent electrode 32 is formed with consideration given to the effective diameter of laser light that enters the liquid crystal device 10 (see FIG. 2).

The transparent electrode 33 is not divided into divided electrodes but is formed as one common electrode. The transparent electrode 33 may be formed in the same electrode pattern as the transparent electrode 32 (i.e., divided into seven divided electrodes), but it is preferable for avoiding complicated wiring that one of the two transparent electrodes be formed as a common electrode. In this embodiment, the transparent electrode 32 is divided into divided electrodes and the transparent electrode 33 is formed as a common electrode, but instead, the transparent electrode 32 may be formed as a common electrode and the transparent electrode 33 may be divided into divided electrodes.

From each of the divided electrodes 32a to 32g and the transparent electrode 33, an unillustrated conductor is drawn out to be connected to a liquid crystal device controller 24 (see FIG. 1) that controls the liquid crystal device 10.

The liquid crystal device 10 is structured as described above, and the reason for structuring the liquid crystal device 10 in such a manner will be described below. As described above, when the collimator lens 4 is moved so that laser light which enters the raising mirror 5 is divergent or convergent light, astigmatism occurs in laser light which is reflected by the second surface 5b of the raising mirror 5 and emitted from the first objective lens 7. Due to the structure of the optical pickup 40, this astigmatism occurs in a particular direction.

The liquid crystal device 10, which serves to correct astigmatism, is provided for the purpose of correcting astigmatism occurring in a particular direction as described above. Thus, the transparent electrode 32 of the liquid crystal device 10 is formed to be elongated in the particular direction (the direction P in FIG. 2) such that astigmatism occurring in the particular direction can be corrected.

The amount of astigmatism generated in laser light is not uniform but has a distribution. To cope with this, the transparent electrode 32 is formed of a plurality of divided electrodes to each of which is independently applied a voltage. In this way, when laser light passes through the divided electrodes 32a to 32g, different portions of the laser light each passing through one of the divided electrodes 32a to 32g are given different phase shifts, and thus astigmatism having a distribution in amount can be corrected.

Among the divided electrodes 32a to 32g, those that may be constantly given the same potential may be formed to have the same potential. For example, in this embodiment, the divided electrodes 32b, 32c, and 32d may have the same potential as the divided electrodes 32e, 32f, and 32g, respectively, and thus conductors drawn out from the divided electrodes 32b, 32c, and 32d are connected to conductors drawn out from the divided electrodes 32e, 32f, and 32g, respectively. This structure helps prevent the wiring from becoming complicated.

The structure of this embodiment is not meant to limit the number and the size of the divided electrodes, and they may be determined, based on the amount and the distribution of astigmatism examined in advance, such that astigmatism can be corrected.

Figure 4:
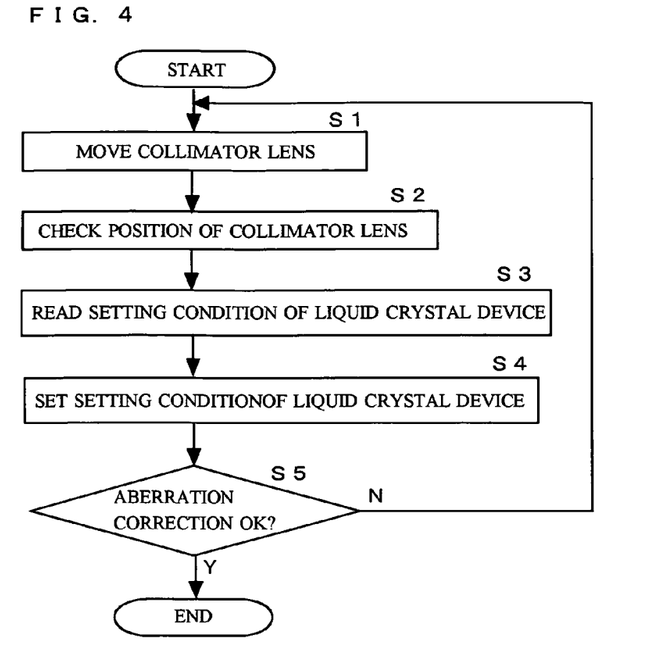
FIG. 4 is a flow chart showing the flow of correcting astigmatism by using a liquid crystal device in the optical pickup embodying the present invention.

Next, a description will be given of the flow of astigmatism correction performed by using the liquid crystal device 10, which is adapted to correct astigmatism, with reference to FIG. 4. FIG. 4 is a flow chart showing the flow of correcting astigmatism by using the liquid crystal device 10 in the optical pickup 40 of this embodiment.

Astigmatism occurs in the case where the collimator lens 4 is moved and thereby laser light is emitted therefrom as divergent or convergent light. Hence, when the collimator lens 4 is moved, astigmatism correction starts to be performed (step S1).

The collimator lens 4 is moved for the purpose of correcting spherical aberration. Thus, the collimator lens 4 is moved, for example, before data reading or writing with respect to the optical disc 50 is started; in the case where the optical disc 50 is a multilayer optical disc, the collimator lens 4 is also moved when there is performed a layer jump in which the focus position moves from a recording layer to another recording layer. The movement of the collimator lens is controlled by a collimator lens controller 25 (see FIG. 1).

When the collimator lens 4 is moved, a control section 23 (see FIG. 1) obtains data of the position of the collimator lens 4 from the collimator lens controller 25 (step S2). The collimator lens 4 is moved by using a stepping motor (not shown). The reference position of the movement of the collimator lens 4 is obtained by using a sensor (not shown) such as a photointerrupter. Thus, the position of the collimated lens 4 is controlled by the collimator lens controller 25.

After obtaining data of the position of the collimator lens 4, the control section 23 reads the setting condition of the liquid crystal device 10 based on data recorded in advance on a memory 26 (step S3). In the memory 26 is stored beforehand data of, for example, positions of the collimator lens 4 and corresponding settings of the liquid crystal device 10 under which the liquid crystal device 10 can best correct astigmatism when the collimator lens 4 is thus positioned, the data having been obtained in advance through an experiment.

Based on the setting condition of the liquid crystal device 10 read by the control section 23, the liquid crystal device controller 24 (see FIG. 1) sets the setting condition of the liquid crystal device 10 (step S4). Depending on the position of the collimator lens 4, the liquid crystal device 10 may not be driven (i.e., no voltage is applied to the transparent electrodes 32 and 33). That is, in the case where the reading of data recorded on a BD is performed by using the optical pickup 40, laser light emitted from the collimator lens 4 is reflected by the first surface 5a of the raising mirror 5, and thus astigmatism does not have to be considered; as a result, the liquid crystal device 10 is not driven.

It is judged whether or not aberration is properly corrected under the set setting condition of the liquid crystal device 10 (step S5). Whether or not aberration is properly corrected is judged according to whether or not an index is lower than a predetermined level, the index being, for example, jitter obtained by processing an electric signal outputted from the photodetector 9. It should be noted, however, that this is not meant to limit the index for judging whether or not aberration is properly corrected to the jitter, and the amplitude of an RF signal or the amplitude of an FE signal, etc., may be used as the index.

In the case where aberration is properly corrected, since the setting condition of the liquid crystal device 10 (and also that of the collimator lens 4) is correct, the setting of the setting condition of aberration correction is completed. In the case where aberration is found not to be properly corrected, steps S1 to S5 are repeated.

In the above structure, when the position of the collimator lens 4 is determined, the setting condition of the liquid crystal device 10 is determined along with the position of the collimator lens 4. This, however, is not meant to be a limitation, and the settings of the collimator lens 4 and the liquid crystal device 10 may be determined, while changing both the settings of the collimator lens 4 and the liquid crystal device 10, such that aberration is the minimum.

The present invention is not limited to the above-described embodiment, and various modifications can be made within the scope of the object of the present invention.

In this embodiment the astigmatism correcting portion (liquid crystal device) 10 is disposed between the collimator lens 4 and the raising mirror 5. However, this is not meant to be a limitation, and the astigmatism correcting portion (liquid crystal device) 10 may be positioned, for example, between the raising mirror 5 and the first wave plate 6.

This embodiment deals with the case where the astigmatism correcting portion is a liquid crystal device. This, however, is not meant to be a limitation; for example, a glass plate may be placed in the location of the liquid crystal device 10 so as to be rotatable around an axis parallel to a direction that is perpendicular to the plane of the figure in FIG. 1 such that astigmatism is corrected by adjusting the rotation amount of the glass plate.

In this embodiment, a semiconductor laser device for DVDs/CDs and a semiconductor laser device for BDs are provided as a plurality of light sources for emitting laser light having different wavelengths, but this is not meant to be a limitation. Instead, one independent semiconductor laser device may be provided for each kind of the optical discs (thus, three semiconductor laser devices are provided), or there may be provided a single three-wavelength semiconductor laser device capable of emitting laser light for BDs, DVDs, and CDs.

In this embodiment, the spherical aberration correcting portion adapted to correct spherical aberration is formed of the collimator lens 4 provided to be movable in the optical axis direction, and spherical aberration is corrected by changing the convergence/divergence state of the laser light. This, however, is not meant to be a limitation, and an expander lens may be used instead of the collimator lens 4. However, it is preferable to use the collimator lens 4 in terms of, for example, a simpler structure.

In this embodiment, in the raising mirror 5, the first surface 5a reflects the laser light for BDs and the second surface 5b reflects the laser light for DVDs/CDs. This, however, is not meant to be a limitation, and the first surface 5a may reflect the laser light for DVDs/CDs and the second surface 5b may reflect the laser light for BDs.

In this embodiment, the raising mirror 5 is given the function of determining whether to guide the laser light to the first objective lens 6 or to the second objective lens 14. This, however, does not mean that the function of determining whether to guide the laser light to the first objective lens 6 or to the second objective lens 14 may be given only to the raising mirror 5. The present invention can be applied to cases where this function is given to a portion other than the raising mirror 5.

This embodiment deals with a case where an optical pickup is compatible with BDs, DVDs, and CDs. This, however is not meant to limit the combination of optical discs with which the optical pickup of the present invention is compatible; needless to say, the optical pickup of the present invention may be compatible with a different combination of optical discs (the number of the kinds of optical discs is not limited to three, either).

What is claimed is:
1. An optical pickup, comprising:
a plurality of light sources emitting light beams having different wavelengths;
a spherical aberration correcting portion for correcting spherical aberration by adjusting convergence/divergence states of the light beams emitted from the light sources;
a reflecting portion having:
a first surface that selects whether to transmit or reflect the light beams emitted from the light sources according to the wavelengths of the light beams; and
a second surface that reflects whichever light beam has passed through the first surface; and
two objective lenses that are selectively used according to whether the light beams emitted from the light sources are reflected from the first surface or from the second surface so as to condense light reflected from the reflecting portion onto a recording layer of an optical disc,
wherein
the first surface and the second surface are formed substantially parallel with each other,
the reflecting portion is disposed between the spherical aberration correcting portion and the objective lenses, and
an astigmatism correcting portion that is formed such that an amount of correction can be changed is further disposed between the spherical aberration correcting portion and the objective lenses.
2. The optical pickup of claim 1,
wherein
the astigmatism correcting portion corrects astigmatism that occurs when a light beam emitted from the spherical aberration correction portion is reflected by the second surface of the reflecting portion.
3. The optical pickup of claim 1,
wherein
the amount of correction is changed according to a setting state of the spherical aberration correcting portion.
4. The optical pickup of claim 2,
wherein
the amount of correction is changed according to a setting state of the spherical aberration correcting portion.
5. The optical pickup of claim 1,
wherein
the astigmatism correcting portion is a liquid crystal device having a liquid crystal and two transparent electrodes between which the liquid crystal is laid.
6. The optical pickup of claim 2,
wherein
the astigmatism correcting portion is formed of a liquid crystal device having a liquid crystal and two transparent electrodes between which the liquid crystal is laid.
7. The optical pickup of claim 1,
wherein
the reflecting portion is a raising mirror that reflects the light beams emitted from the light sources toward the optical disc.
8. The optical pickup of claim 2,
wherein
the reflecting portion is a raising mirror that reflects the light beams emitted from the light sources toward the optical disc.
9. The optical pickup of claim 1,
wherein
the spherical aberration correcting portion is a movable lens that is movable in an optical axis direction.
10. The optical pickup of claim 2,
wherein
the spherical aberration correcting portion is a movable lens that is movable in an optical axis direction.

11. The optical pickup of claim 9,
wherein
the movable lens is a movable collimator lens.

12. The optical pickup of claim 10,
wherein
the movable lens is a movable collimator lens.

13. A method for correcting aberration for use in an optical pickup, including:
  a spherical aberration correcting portion for correcting spherical aberration by adjusting a convergence/divergence state of a light beam emitted from a light source;
  a reflecting portion having:
    a first surface that selects whether to transmit or reflect the light beam emitted from the light source according to a wavelength of the light beam; and
    a second surface that reflects a light beam that has passed through the first surface; and
  two objective lenses that are selectively used according to whether the light beam emitted from the light source is reflected from the first surface or from the second surface so as to condense light reflected from the reflecting portion onto a recording layer of an optical disc,
  there being disposed, between the spherical aberration correcting portion and the objective lenses in the optical pickup, an astigmatism correcting portion that is formed such that an amount of correction can be changed,
the method comprising:
changing a setting of the astigmatism correcting portion as a setting of the spherical aberration correcting portion is changed.

* * * * *